US008241510B2

(12) United States Patent
Sakurai

(10) Patent No.: US 8,241,510 B2
(45) Date of Patent: Aug. 14, 2012

(54) INKJET RECORDING HEAD, METHOD FOR PRODUCING SAME, AND SEMICONDUCTOR DEVICE

(75) Inventor: Makoto Sakurai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 948 days.

(21) Appl. No.: 12/017,221

(22) Filed: Jan. 21, 2008

(65) Prior Publication Data

US 2008/0173616 A1 Jul. 24, 2008

(30) Foreign Application Priority Data

Jan. 22, 2007 (JP) ................................ 2007-011289

(51) Int. Cl.
*G01D 15/00* (2006.01)
*G11B 5/127* (2006.01)
*B41J 2/14* (2006.01)

(52) U.S. Cl. ................................ 216/27; 216/37; 216/58

(58) Field of Classification Search ................. 29/890.1; 347/5, 20, 44, 78, 84; 360/119.02, 119.05; 438/21, 689, 800; 216/83, 27, 37, 39, 41, 216/47, 58
See application file for complete search history.

(56) References Cited

U.S. PATENT DOCUMENTS 7,895,750 B2 * 3/2011 Park et al. .................... 29/890.1
2001/0002135 A1 * 5/2001 Milligan et al. ................ 347/65
2002/0080214 A1 * 6/2002 Higuchi et al. ................. 347/68
2003/0038108 A1 * 2/2003 Koyama et al. ................. 216/27
2006/0044353 A1 * 3/2006 Kobayashi ...................... 347/54
2006/0066672 A1 * 3/2006 Park et al. ....................... 347/47

FOREIGN PATENT DOCUMENTS

EP 1284188 A2 * 2/2003
JP 9-11478 1/1997
WO WO 2006129072 A1 * 12/2006

OTHER PUBLICATIONS

Machine Translation of Japanese Laid Open Patent Application JP 09-011478 A.*

* cited by examiner

*Primary Examiner* — Shamim Ahmed
*Assistant Examiner* — Bradford Gates
(74) *Attorney, Agent, or Firm* — Canon USA Inc IP Division

(57) ABSTRACT

A method for producing an inkjet recording head includes preparing the substrate having a through hole to be formed into a supply port, the through hole having openings on the first surface and the second surface, the substrate having a first protective layer disposed on the second surface, the first protective layer having an overhang extending into the region of the opening on the second surface. The method also includes forming a second protective layer so as to continuously cover at least the overhang of the first protective layer and the inner wall of the through hole, and removing a portion of the second protective layer corresponding to the opening on the first surface.

9 Claims, 5 Drawing Sheets

INKJET RECORDING HEAD, METHOD FOR PRODUCING SAME, AND SEMICONDUCTOR DEVICE

BACKGROUND OF THE INVENTION

1. Field of the Invention

The present invention relates to an inkjet recording head, a method for producing the inkjet recording head, and a semiconductor device.

2. Description of the Related Art

In the field of inkjet recording heads (hereinafter, also referred to as "recording heads"), structures having supply ports passing through substrates have been developed for various purposes. Japanese Patent Laid-Open No. 9-11478 discloses that a protective layer is formed on the wall of a supply port in order to prevent elution of a substrate material into ink.

However, ink may gradually permeate in the interface between the protective layer and a functional layer exposed at the wall of the supply port. In the case where the permeated ink reaches the substrate and where ink circulates readily through a permeation route, the amount of elution of the substrate material into ink may be increased, causing defects such as clogging of a discharge port.

SUMMARY OF THE INVENTION

The present invention provides an inkjet recording head having a supply port effectively coated with a protective film that inhibits permeation of ink into a substrate.

According to an embodiment of the present invention, a method for producing an inkjet recording head including a substrate having a first surface and a second surface opposite the first surface, the substrate being provided with an energy-generating element disposed on the first surface, the energy-generating element being configured to generate energy utilized for discharging ink, and the head including a supply port configured to supply ink, the supply port passing from the first surface to the second surface of the substrate is provided. The method includes preparing the substrate having a through hole to be formed into a supply port, the through hole having openings on the first surface and the second surface, the substrate having a first protective layer disposed on the second surface, the first protective layer having an overhang extending into the region of the opening on the second surface. The method also includes forming a second protective layer so as to continuously cover at least the overhang of the first protective layer and the inner wall of the through hole, and removing a portion of the second protective layer corresponding to the opening on the first surface.

Further features of the present invention will become apparent from the following description of exemplary embodiments with reference to the attached drawings.

DESCRIPTION OF THE EMBODIMENTS

Figure 1A:
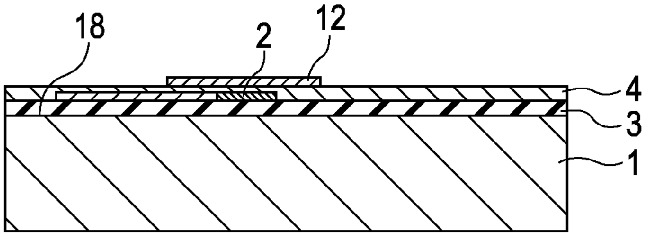
FIGS. 1A to 1E are schematic cross-sectional views illustrating a method for producing an inkjet recording head according to an embodiment of the present invention.

Embodiments of the present invention will be described below with reference to the attached drawings.

In the following description, elements having identical functions are designated using the same reference numerals in the figures. Redundant description is not repeated, in some cases.

Liquid discharge heads can be mounted on printers, copiers, faxes including communication systems, apparatuses such as word processors including printing portions, and industrial recording apparatuses in combination with various processing devices. Recording can be performed on various recording media, such as paper, yarn, fibers, cloths, leather, metals, plastic, glass, wood, and ceramic materials, with liquid discharge heads. The term "recording" used in the specification refers to providing recording media with images such as patterns having no meaning as well as images such as characters and figures having meanings.

The terms "ink" and "liquid" should be broadly interpreted and refer to a liquid in which the liquid is applied to a recording medium to form an image, a design, a pattern, or the like, process the recording medium, or perform treatment of ink or the recording medium. Examples of the treatment of ink or the recording medium include improvements of fixity, recording quality, coloring, image permanence, and the like by solidification or insolubilization of coloring materials in ink with which a recoding medium is provided.

An inkjet recording head (hereinafter, referred to as a "recording head") to which the present invention can be applied will be described below.

Figure 5:
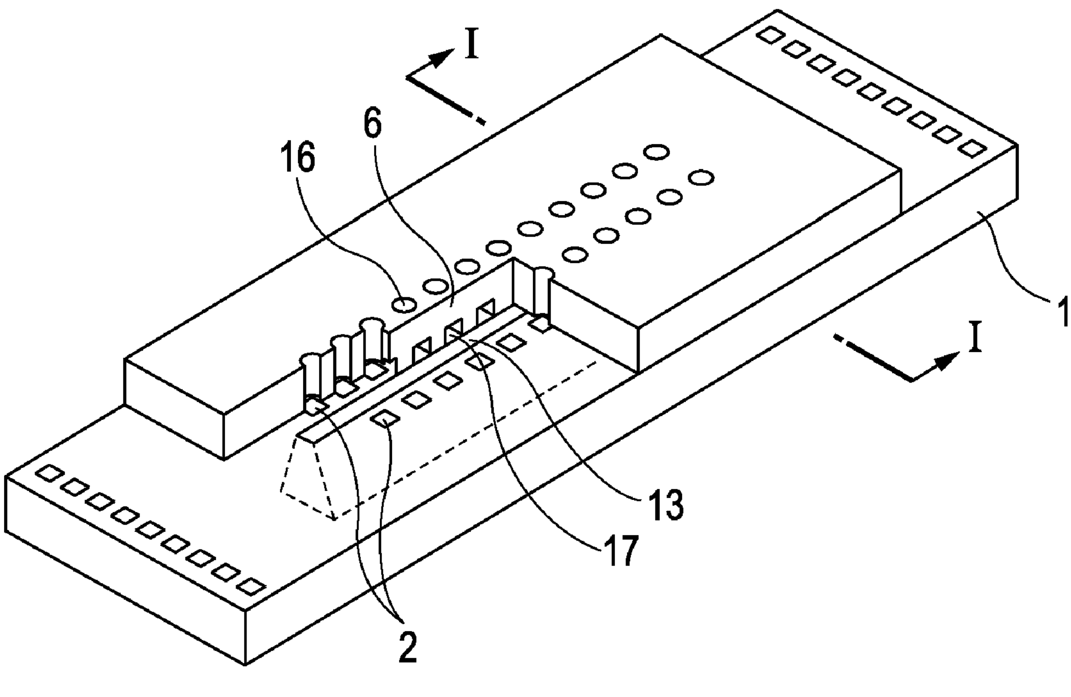
FIG. 5 is a schematic perspective view of an inkjet recording head according to an embodiment of the present invention.

FIG. 5 is a schematic diagram of a recording head according to an embodiment of the present invention.

The recording head according to the embodiment of the present invention includes a substrate 1 provided with energy-generating elements 2 formed at predetermined intervals, the energy-generating elements 2 being configured to generate energy utilized for discharging ink. In the substrate 1, a supply port 13 configured to supply ink is formed between two rows of the energy-generating elements 2. A passage-forming member 6 is formed on the substrate 1. The passage-forming member 6 includes discharge ports 16 formed above the respective energy-generating elements 2, and ink passages 17 each communicating with the supply port 13 and a corresponding one of the discharge ports 16. The shape of the supply port 13 is not particularly limited. The supply port 13 can have a structure in which an angle defined by a surface of the substrate 1 and an inner wall of the supply port 13 is close to 90°.

The recording head is disposed in such a manner that a surface on which the discharge ports 16 are formed faces a recording face of a recording medium. In this recording head, recording is performed by applying pressure generated by the energy-generating elements 2 to ink filled in the passages through the supply port 13, discharging ink droplets from the discharge ports 16, and attaching the ink droplets to the recording medium.

A method for producing a recording head according to an embodiment of the present invention will be described in detail below with reference to FIGS. 1A to 1E.

FIGS. 1A to 1E are schematic cross-sectional views illustrating a method for producing a recording head according to an embodiment of the present invention in order of steps, the views being taken along line I-I in FIG. 5.

The silicon substrate 1 is prepared. An element-insulating film 3 is formed on one surface 18 of the substrate 1. Predetermined numbers of the energy-generating elements 2 configured to generate energy utilized for discharging ink and driving circuits used for the energy-generating elements 2 are formed on the element-insulating film 3. An element protective film 4 and, as needed, a metal film 12 are formed (FIG. 1A).

Although a step of forming electrical control circuits configured to drive the energy-generating elements 2 is not described here, in fact, the electrical control circuits are formed on the substrate 1. The one surface of the substrate 1, which is a surface on which the energy-generating elements 2 is provided, is defined as a front surface. A surface opposite the one surface of the substrate 1 is defined as a back surface.

Figure 1B:
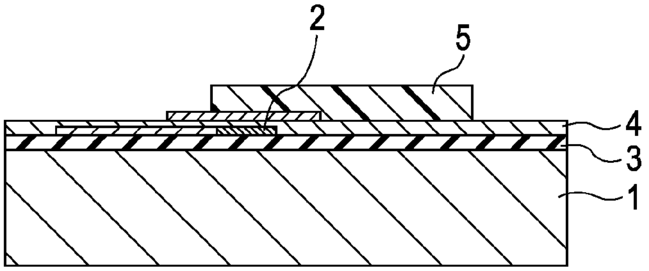

A photoresist layer is uniformly formed with a spin coater, a roll coater, or the like. The photoresist layer is patterned by photolithography. Thereby, a passage pattern member 5 composed of a photoresist is formed on a position of the one surface 18 of the substrate 1 corresponding to the energy-generating elements 2 (FIG. 1B). As the material constituting the passage pattern member 5, a positive photoresist, which is a removable resin material, is used. The positive photoresist may be appropriately selected from Deep-UV resists, ODUR-1010 (manufactured by Tokyo Ohka Kogyo Co., Ltd.), AZ-4903 (manufactured by Hoechst), PMER-PG7900 (manufactured by Tokyo Ohka Kogyo Co., Ltd.), and the like.

Figure 1C:
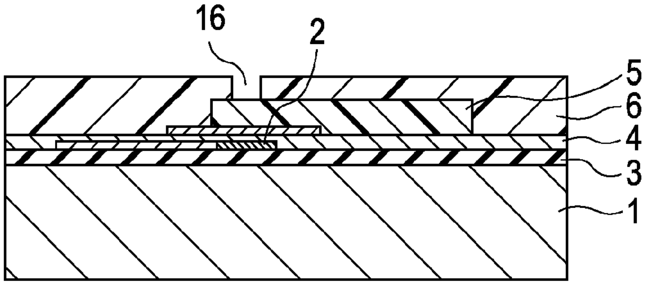

A layer to be formed into the passage-forming member 6 is formed on the passage pattern member 5. The discharge ports 16 for ink are formed at positions of the layer corresponding to the energy-generating elements 2 and the passage pattern member 5, thereby forming the passage-forming member 6 (FIG. 1C).

The material constituting the passage-forming member 6 is can be selected from materials excellent in adhesion to the substrate 1, mechanical strength, dimension stability, and corrosion resistance. Specifically, liquid curable materials that can be cured by heat, ultraviolet irradiation, and electron beam irradiation can be used. Among these, epoxy resins, acrylic resins, diglycoldialkyl carbonate resins, unsaturated polyester resins, polyurethane resins, polyimide resins, melamine resins, phenol resins, urea resins, negative photoresist resins, and the like are can be used. In the case where a liquid curable material is used for the passage-forming member 6, for example, the liquid curable material is applied to the one surface 18 of the substrate 1 by a known method, such as curtain coating, roll coating, or spray coating to form a film having a target thickness.

A method for forming the discharge ports 16 may be appropriately selected depending on the material constituting the passage-forming member 6. For example, photolithography is performed, and then removal is performed with a solvent. Alternatively, physical processing, such as dry etching, wet etching, drilling, sandblasting, laser processing, and ion milling, may be employed.

Figure 1D:
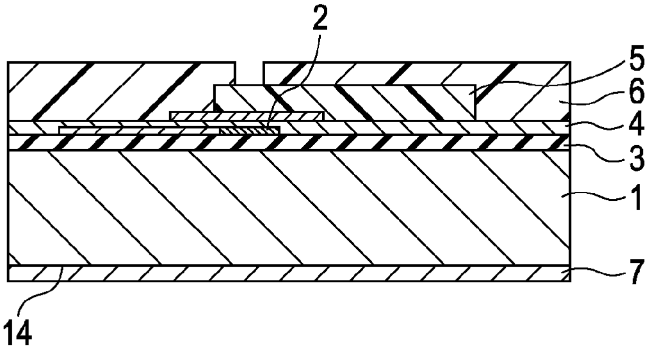

A first protective layer 7 is formed on the back surface 14 of the substrate 1 (FIG. 1D). The first protective layer 7 may be formed by, for example, a film-forming method, such as CVD or sputtering, vacuum deposition, or application.

Figure 1E:
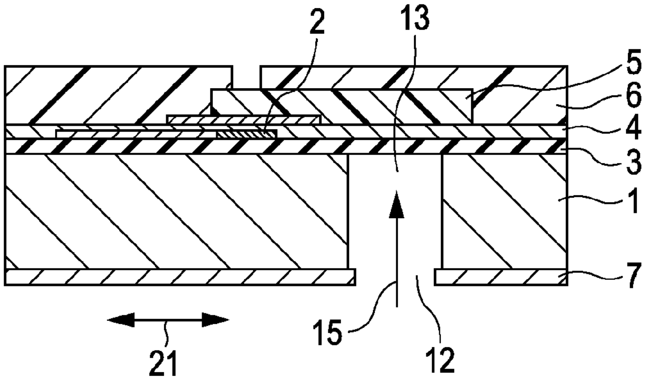

A photoresist (not shown) is applied to the first protective layer 7 and patterned by lithography to form a resist mask. The first protective layer 7 is etched with the resist mask to form an opening 12. After removal of the resist mask, the substrate 1 is etched in the thickness direction 15 with the first protective layer 7 as a mask, to form a through hole 13 to be formed into an ink-supplying port. Thereby, the element-insulating film formed on the substrate 1 is exposed to the opening of the through hole 13 on the one surface 18 side. Alternatively, the resist mask is not removed, and the through hole 13 may be formed with the resist mask. In this case, etching conditions of the first protective layer 7 and the substrate 1 are controlled in such a manner that the cross-sectional area of the opening 12 (in the direction parallel to the substrate 1) is smaller than that of the through hole 13 (FIG. 1E). In this case, the shape of the through hole 13 is not particularly limited. In this description, a shape in which an angle defined by the back surface 14 and an inner wall of the through hole 13 is substantially 90° is exemplified as shown in FIG. 1E. The first protective layer 7 protrudes into the opening 12.

To obtain such a structure, the etching conditions are required to be set in such a manner that the substrate 1 is etched in the direction perpendicular to the thickness direction 15 (i.e., the planar direction 21 of the substrate 1) as well as in the thickness direction 15. Specifically, the following methods are employed: (I) a method in which anisotropic etching is performed in the thickness direction 15 while the etching rate in the planar direction 21 is adjusted; and (II) a combination of anisotropic etching in the thickness direction 15 and isotropic etching. These methods will be described below.

In this step, a through hole for a through-hole electrode used for feeding current to energy-generating elements and driving circuits therefor may be simultaneously formed. The detailed description is omitted.

The element-insulating film 3 and the element protective film 4 are removed by etching with the first protective layer 7 and the passage pattern member 5 as etch stop layers (FIG. 2A), thereby exposing the passage pattern member 5.

Figure 2A:
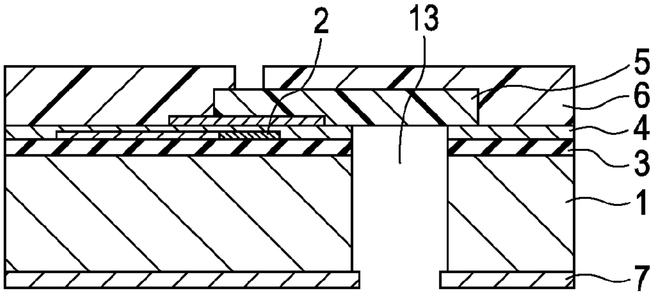
FIGS. 2A to 2D are schematic cross-sectional views illustrating the method for producing the inkjet recording head according to the embodiment of the present invention.
Figure 2B:
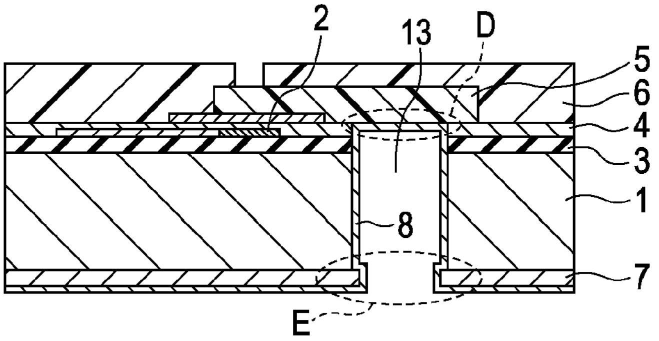

A second protective layer 8 is formed from the back surface 14 side so as to continuously cover the first protective layer 7 and the inner wall of the through hole 13 (FIG. 2B). The second protective layer 8 is also formed so as to reach the passage pattern member 5. The second protective layer 8 may be formed by a known film-forming method, such as CVD or sputtering, or application. Examples of the material constituting the first protective layer 7 include silicon oxide, SiON, SiN, SiC, and SiOC. In this step, the second protective layer 8 is formed on the entirety of the first protective layer 7 and the inner wall of the through hole 13. Alternatively, the second protective layer 8 may be formed after the state shown in FIG. 1E is obtained. In this case, the second protective layer 8 is formed so as to be in contact with the element-insulating film 3.

Figure 2C:
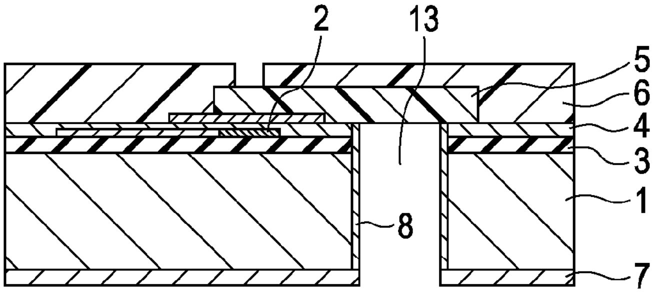

The second protective layer 8 is removed by etching so as to remain on only the inner wall of the through hole 13 (FIG. 2C). That is, Portion D (indicated by a dotted frame shown in FIG. 2B) of the second protective layer 8 covering the passage pattern member 5 and opposing the opening 12 on the back surface side is removed. In this case, selective etching may be performed from the opening 12 to the inside of the through hole. Alternatively, the whole of the back surface of the substrate may be etched.

Figure 2D:
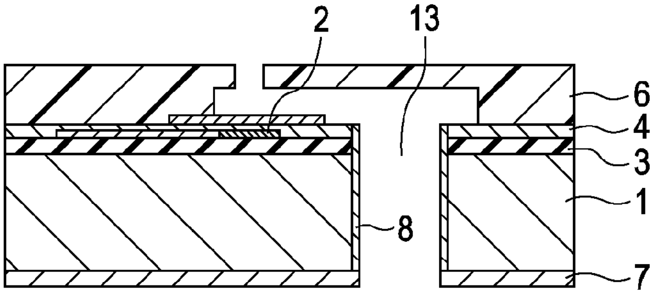

In this case, the entire second protective layer 8 is etched to expose the first protective layer 7, in some cases. The etching rate at Portion D of the second protective layer 8 is lower than the etching rate around the opening 12 (Portion E indicated by a dotted frame shown in FIG. 2B) because etching is performed from the back surface of the substrate. Thus, if etching is performed in such a manner that Portion D is completely removed, Portion E may be excessively etched to expose the substrate 1. In this embodiment, the first and second protective layers protrude into the opening 12; hence, the total thickness of the first and second protective layers at Portion E is large. Thus, even when etching is performed to remove the Portion D of the protective layer, the substrate is satisfactorily covered with the protective layers at Portion E. To leave the protective layer on only the inner wall of the through hole, etching conditions, such as an etching time and an etching rate, may be controlled. With respect to the etching conditions, specifically, etching may be performed at a relatively high degree of vacuum, and etching may be performed at a higher RF voltage applied to the substrate. Both conditions can be controlled. Etching under such conditions results in an increase in the vertical component of the incidence angle of ions. Alternatively, etching may be performed using a mixed gas containing an atomic gas such as an Ar gas. Furthermore, etching using a plasma source, e.g., ECR etching, common parallel plate RIE, or ICP etching, may be employed. Then the passage pattern member 5 is removed (FIG. 2D)

The inkjet recording head can be produced through the steps in the production method of the present invention.

Figure 3A:
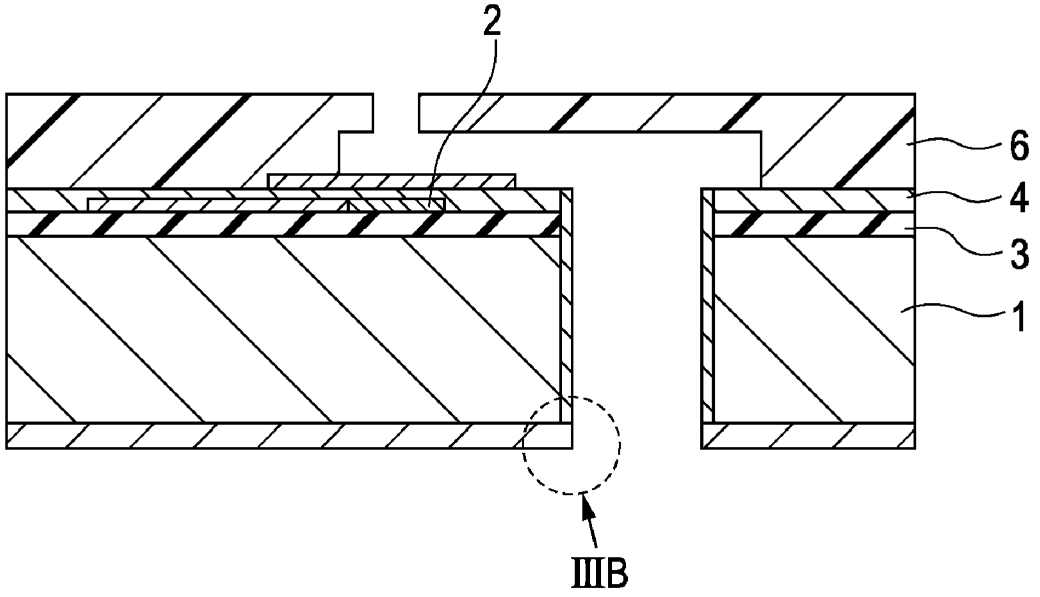
FIGS. 3A and 3B are schematic cross-sectional views of an inkjet recording head according to an embodiment of the present invention.
Figure 3B:
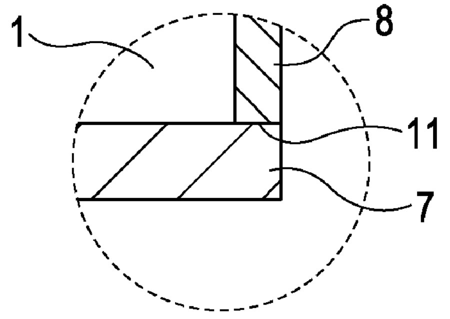
Figure 4A:
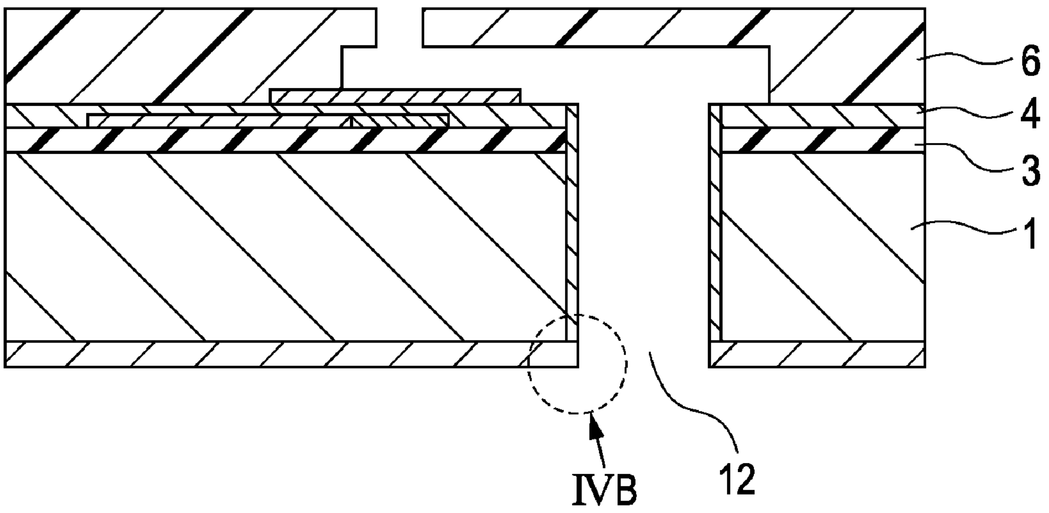
FIGS. 4A and 4B are schematic cross-sectional views of an inkjet recording head according to an embodiment of the present invention.
Figure 4B:
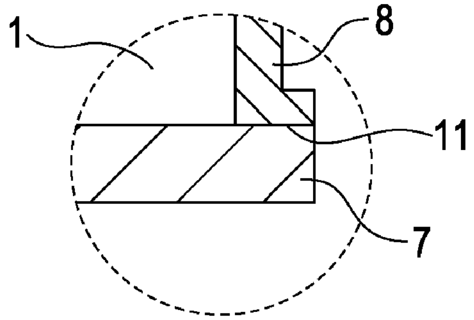

As shown in FIGS. 3B and 4B, an end of the second protective layer varies depending on the relationship among the dimension of the opening of the first protective layer, the dimension of the opening of the through hole, and the thickness of the second protective layer. FIGS. 3A and 4A are schematic cross-sectional views of a recording head as in FIGS. 1A to 1E. FIGS. 3B and 4B are partially enlarged views thereof. In FIG. 4B, the first protective layer 7 protrudes into the opening 12, and the thickness of the second protective layer 8 at a contact portion 11 between the second protective layer 8 and the first protective layer 7 is larger than that of other portions. The first protective layer 7 is in contact with the end of the opening 12 side of the second protective layer 8. In any case, the first protective layer 7 can sufficiently protect the end of the second protective layer, thereby preventing the permeation of ink in operation and effectively inhibiting permeation of ink into the substrate.

Then electrical connections are made to complete the recording head.

Example 1

Example of the present invention will be described with reference to FIGS. 1A to 2D.

A substrate 1 having a thickness of about 400 μm was prepared. An element-insulating film 3 composed of $SiO_2$ and having a thickness of 0.45 μm was formed on one surface of the substrate 1 by thermal CVD. Energy-generating elements 2 were formed by a common semiconductor process technique. An element protective film 4 composed of SiN and having a thickness of 0.3 μm was formed by plasma-enhanced CVD (FIG. 1A).

A positive photoresist resin mainly composed of polymethyl isopropenyl ketone and having a thickness of about 12 μm was applied to the one surface of the substrate 1 and then patterned by photolithography to form a passage pattern member 5 at a position corresponding to the energy-generating elements 2 (FIG. 1B).

A cationically polymerizable epoxy resin was applied to the one surface of the substrate so as to have a thickness of about 12 μm. Exposure was performed at about 1 J/$cm^2$ with an exposure apparatus (trade name: MPA600-FA, manufactured by CANON KABUSHIKI KAISHA). Removal of an unexposed portion with a mixture of xylene and methyl isobutyl ketone resulted in the formation of a passage-forming member 6 and ink discharge ports 16 (FIG. 1C).

A $SiO_2$ layer 7 having a thickness of about 0.5 μm was formed on the back surface 14 of the substrate 1 by plasma-enhanced CVD (FIG. 1D).

A resist mask (not shown) was formed. The $SiO_2$ layer 7 was etched by RIE with a $CF_4$ gas and the like to form an opening 12 having a circular cross section. The following etching of the substrate 1 was performed with the resist mask as follows. First, etching was performed under conditions described below.

Apparatus: ICP-RIE apparatus

Gas: Mixed gas of $SF_6$ (10 to 200 sccm) and $O_2$ (0.5 to 60 sccm)

Thereby, a through hole 13 having a circular cross section was formed. At this point, the opening 12 had a diameter of about 60 μm. The through hole 13 had a diameter of about 64 μm. That is, the opening had a cross-sectional area smaller than that of the through hole (FIG. 1E).

The element-insulating film 3 and the element protective film 4 were removed by RIE with a $CF_4$ gas and the like using the resist mask used in the foregoing step and the passage pattern member 5 as an etch stop layer (FIG. 2A).

After removal of the resist mask, a poly-p-xylene layer 8 having a thickness of about 3 μm was formed on the first protective layer 7 and the inner wall of the through hole 13 by CVD (FIG. 2B).

Etching was performed under the following conditions, thereby removing Portion E (see FIG. 2B) of the poly-p-xylene layer 8 (FIG. 2C).

Apparatus: M318, manufactured by Hitachi, Ltd.

Gas: Oxygen, 50 sccm

Exposure was performed from the surface side of the substrate with a UV irradiation apparatus. The passage pattern member 5 was removed by immersion in methyl lactate while ultrasound was applied (FIG. 2D).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-011289 filed Jan. 22, 2007, which is hereby incorporated by reference herein in its entirety.

What is claimed is:

1. A method for producing an inkjet recording head including a substrate having a first surface and a second surface opposite the first surface, the substrate being provided with an energy-generating element at the first surface side, the energy-generating element being configured to generate energy utilized for discharging ink, and the head including a supply port configured to supply ink, the supply port passing from the first surface to the second surface of the substrate, the method comprising:

forming a first protective layer at the second surface side of the substrate;

forming a through hole to be formed into a supply port in the substrate by reactive ion etching, the through hole having openings on the first surface and the second surface, the substrate having the first protective layer disposed on the second surface, the first protective layer having an overhang extending into the region of the opening on the second surface;

forming a second protective layer so as to continuously cover the overhang of the first protective layer and an inner wall from the first surface to the second surface; and removing a portion of the second protective layer at the first surface side and corresponding to the opening on the first protective layer in such a way that a portion of the second protective layer to cover the inner wall of the through hole remains.

2. The method according to claim 1, wherein in the removing step, the portion of the second protective layer at the first surface side corresponding to the opening and part of a portion of the second protective layer covering the overhang are removed by etching in one operation.

3. The method according to claim 1, wherein the second protective layer is composed of poly-p-xylene.

4. The method according to claim 1, wherein the first protective layer is composed of silicon oxide.

5. The method according to claim 1, wherein in the forming step of forming the second protective layer, the second protective layer is formed so as to be in contact with a layer provided at the first surface side of the substrate.

6. The method according to claim 2, wherein the etching is dry etching, and the entire substrate is subjected to dry etching from the second surface side.

7. The method according to claim 1, wherein the first protective layer is composed of SiON, SiN, SiC, or SiOC.

8. The method according to claim 1, wherein, when removing a portion of the second protective layer, a portion of the second protective layer covering the first protective layer at the second surface is removed.

9. The method according to claim 1, wherein the second protective layer is formed so as not to cover the energy-generating element.

* * * * *